(12) United States Patent
Niu et al.

(10) Patent No.: US 11,034,856 B2
(45) Date of Patent: Jun. 15, 2021

(54) PRIMER COMPOSITIONS (71) Applicant: Hewlett-Packard Development Company, L.P., Fort Collins, CO (US)

(72) Inventors: Bor-Jiunn Niu, San Diego, CA (US); Tao Chen, San Diego, CA (US); Haigang Chen, San Diego, CA (US); Silke Courtenay, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 225 days.

(21) Appl. No.: 15/569,346

(22) PCT Filed: Aug. 28, 2015

(86) PCT No.: PCT/US2015/047481
§ 371 (c)(1),
(2) Date: Oct. 25, 2017

(87) PCT Pub. No.: WO2017/039589
PCT Pub. Date: Mar. 9, 2017

(65) Prior Publication Data
US 2018/0312717 A1    Nov. 1, 2018

(51) Int. Cl.
*C09D 175/00*    (2006.01)
*C09D 175/04*    (2006.01)
(Continued)

(52) U.S. Cl.
CPC ............. *C09D 175/04* (2013.01); *B41M 5/52* (2013.01); *C08L 9/04* (2013.01); *C09D 7/63* (2018.01); *C09D 7/65* (2018.01); *C09D 109/04* (2013.01); *C09D 129/04* (2013.01); *D21H 17/36* (2013.01); *D21H 17/57* (2013.01); *D21H 19/20* (2013.01); *D21H 19/24* (2013.01); *D21H 19/60* (2013.01); *D21H 19/62* (2013.01); *B41M 5/5218* (2013.01); *B41M 5/5236* (2013.01);
(Continued)

(58) Field of Classification Search
None
See application file for complete search history.

(56) References Cited

U.S. PATENT DOCUMENTS

| | | |
|---|---|---|
| 5,084,492 A | 1/1992 | Pinell et al. |
| 5,102,856 A | 4/1992 | Doll et al. |

(Continued)

FOREIGN PATENT DOCUMENTS

| | | |
|---|---|---|
| CN | 1572532 | 2/2005 |
| CN | 1582234 | 2/2005 |

(Continued)

OTHER PUBLICATIONS

European Search Report dated Nov. 27, 2017 for PCT/US2015/047481; Applicant Hewlett-Packard Development Company, L.P.
(Continued)

*Primary Examiner* — Stefanie J Cohen
(74) *Attorney, Agent, or Firm* — Thorpe North & Western LLP (57) ABSTRACT

The present disclosure is drawn to primer compositions, which can include a binder including polyvinyl alcohol, starch nanoparticles, and a polyurethane dispersion. The primer competitions can also include a cationic salt and water.

20 Claims, 2 Drawing Sheets

(51) Int. Cl.
*D21H 19/20* (2006.01)
*C09D 109/04* (2006.01)
*B41M 5/52* (2006.01)
*D21H 19/24* (2006.01)
*D21H 17/36* (2006.01)
*D21H 19/60* (2006.01)
*D21H 17/57* (2006.01)
*D21H 19/62* (2006.01)
*C08L 9/04* (2006.01)
*C09D 7/65* (2018.01)
*C09D 7/63* (2018.01)
*C09D 129/04* (2006.01)
*C08L 3/02* (2006.01)
*C09D 11/38* (2014.01)

(52) U.S. Cl.
CPC ......... *B41M 5/5254* (2013.01); *B41M 5/5281* (2013.01); *C08L 3/02* (2013.01); *C08L 2312/00* (2013.01); *C09D 11/38* (2013.01)

(56) References Cited

U.S. PATENT DOCUMENTS

| | | |
|---|---|---|
| 8,821,997 B2 | 9/2014 | Romano et al. |
| 2003/0021962 A1 | 1/2003 | Mukherjee et al. |
| 2004/0202957 A1* | 10/2004 | Murota ................... G03F 7/029 430/270.1 |
| 2005/0153147 A1 | 7/2005 | Khoultchaev et al. |
| 2006/0014014 A1 | 1/2006 | Van Den Abbeele et al. |
| 2008/0255276 A1* | 10/2008 | Jetzinger ................... C08J 3/24 524/35 |
| 2008/0311384 A1 | 12/2008 | Toles et al. |
| 2009/0203832 A1* | 8/2009 | Muller ...................... C08F 2/24 524/557 |
| 2011/0012974 A1* | 1/2011 | Niu ....................... D06P 1/5221 347/105 |
| 2012/0154502 A1* | 6/2012 | Romano, Jr. ........ B41M 5/5218 347/105 |
| 2012/0212555 A1* | 8/2012 | Romano, Jr. .......... D21H 19/38 347/106 |
| 2013/0095333 A1 | 4/2013 | Pal et al. |
| 2014/0212591 A1* | 7/2014 | Swei ........................ C09D 4/06 427/385.5 |
| 2017/0190929 A1* | 7/2017 | Li .......................... C09D 11/38 |

FOREIGN PATENT DOCUMENTS

| | | |
|---|---|---|
| CN | 1965046 | 5/2007 |
| CN | 101678691 | 3/2010 |
| EP | 0747235 | 8/2000 |
| EP | 1228889 | 9/2005 |
| KR | 20020085255 | 11/2002 |
| WO | 2013041561 | 3/2013 |

OTHER PUBLICATIONS

International Search Report and Written Opinion dated May 3, 2016 for PCT/US2015/047481; Applicant Hewlett-Packard Development Company L.P.

* cited by examiner

100

Applying a primer composition to a media substrate, wherein the primer composition comprises a binder including polyvinyl alcohol, starch nanoparticles, and a polyurethane dispersion; the primer composition further comprising a cationic salt and water — 110

PRIMER COMPOSITIONS

BACKGROUND

There are several reasons that inkjet printing has become a popular way of recording images on various media surfaces, particularly paper. Some of these reasons include low printer noise, variable content recording, capability of high speed recording, and multi-color recording. Additionally, these advantages can be obtained at a relatively low price to consumers. Though there has been great improvement in inkjet printing, accompanying this improvement are increased demands by consumers in this area, e.g., higher speeds, higher resolution, full color image formation, increased stability, etc. Additionally, inkjet printing is becoming more prevalent in high speed commercial printing markets, competing with more laborious offset and gravure printing technologies. Coated media typically used for these more conventional types of printing, e.g., offset or gravure printing, can perform somewhat acceptably on high speed inkjet printing devices, but these types of media are not always acceptable for inkjet technology as it relates to image quality, gloss, abrasion resistance, and other similar properties.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Reference will now be made to several examples that are illustrated herein, and specific language will be used herein to describe the same. It will nevertheless be understood that no limitation of the scope of the disclosure is thereby intended.

DETAILED DESCRIPTION

The present disclosure is drawn to primer compositions. In some examples, the primer compositions can be ink-receiving primer compositions, in that the primer compositions can be used to form coatings for receiving inks such as inkjet inks. The primer compositions can be applied to a substrate to form an ink-receiving layer on the substrate before printing inkjet ink over or onto the primer layer. In one example, a primer composition can be applied to offset coated paper. Typically, offset coated papers are significantly different from paper specifically designed for inkjet printing. Commercial offset paper often includes a smooth, non-porous surface coating that is difficult to penetrate by aqueous liquids. In many cases, offset coatings include inorganic pigments such as calcium carbonate and clay, as well as hydrophobic polymers that interact poorly with water-based inks. Polymers used in offset media can also sometimes include latex binders, polystyrenes, polyolefins (polypropylene, polyethylene, polybutadiene), polyesters (PET), polyacrylates, polymethacrylates, poly (maleic anhydride), and/or others. As a result of the hydrophobic and non-porous properties of offset media, water-based inks printed on offset media often have poor image quality, dry very slowly (sometimes taking more than 24 hours), and have poor durability after drying.

The primer compositions described herein can be applied to a media substrate to improve the ability of the substrate to receive water-based inks. For example, a primer composition can be coated on a media substrate to improve the durability of images printed with water-based inks. In one example, a media substrate that is normally less suitable for printing with water-based inks, such as offset media, can be coated with the primer composition prior to printing. This coated media substrate can interact with water-based inks and provided a printed image with good durability after the ink dries on the coated media substrate.

In further detail, the primer composition can include a water soluble polymeric binder, e.g., at least partially water soluble (at least 5%), mostly water soluble (at least 50%), or fully water soluble (at least 99%) in the primer composition. Water soluble polymers can interact better with water-based inks compared to the hydrophobic coatings of offset media. However, many types of water soluble polymeric binder exhibit poor dry smearfastness immediately after printing due to poor wet film strength. For example, starches, cellulose, polyethylene oxide, and polyvinylpyrrolidone (PVP) are examples of water soluble polymers that can have poor dry smearfastness when used in primers on offset media.

Poor dry smearfastness immediately after printing can be problematic because the printed image can be easily smeared if the image is rubbed or otherwise disturbed soon after printing. For example, when using an HP high speed Web Press®, the printing is a continuous process and the paper is rewound as a roll after printing. The image or text printed on the paper can be smeared when the paper is rewound if the dry durability is poor. Prior solutions to this problem have included reducing the printing speed, increasing drying temperature, or increasing the drying zone. Several disadvantages are associated with these solutions, however. For example, increasing the drying time requires reducing the production rate, which increases the cost or time cost of printing. Harsh drying conditions can cause increased paper cockle. Increasing the size of the drying zone makes the printing system occupy a larger space, which increases the total cost or space cost of printing.

Surprisingly, certain primer compositions including polyvinyl alcohols have been found to provide much better dry smearfastness immediately after printing. Thus, the primer composition can include polyvinyl alcohol as the water soluble polymeric binder. In addition to the polyvinyl alcohol, the primer composition can include a cationic salt. Thus, the hydroxyl groups of the polyvinyl alcohol can interact with the cationic salt to form a complex-like structure. This structure can result in enhanced wet film strength of the primer layer and the ink printed on top of the primer layer. When inkjet ink is printed on top of the primer, the ink can have improved instant dry smearfastness.

Although primer compositions including polyvinyl alcohols can provide desirable dry smearfastness, it is difficult to achieve both dry smearfastness and wet smearfastness at the same time. Poor wet smearfastness can cause poor mechability because the printed substrate can often be rewound before the primer layer and image are completely dry. Mixtures of different water soluble polymeric binders can be used to adjust the dry smearfastness and wet smearfastness of the primer composition. However, many mixtures of water soluble polymeric binders are unable to provide both good dry smearfastness and good wet smearfastness. For example, mixtures of polyvinyl alcohol with only larger particle-sized starch, e.g., 10 μm to 100 μm, can in some cases provide good dry smearfastness or good wet smearfastness, but not both at the same time. However, certain primer compositions including a mixture of polyvinyl alcohol, starch nanoparticles, and a polyurethane dispersion have been found to provide better dry smearfastness and wet smearfastness at the same time. This combination of binders has also been found to provide good paper gloss.

The primer composition can be used on offset paper in a continuous printing system such as the HP high speed Web Press® mentioned above. In some cases, the instant dry and wet smearfastness of the printed image can be such that no smearing occurs when the printed paper is rewound into a roll after printing. Because the printed image does not require extra time to dry before rewinding the paper, the press can run at a high speed. These advantages can be obtained without compromising print quality.

With this description in mind, in some examples, the present technology provides primer compositions. In one example, a primer composition can include from 5 wt % to 70 wt % of a binder which includes a polyvinyl alcohol, starch nanoparticles, and a polyurethane dispersion. The primer composition can also include a cationic salt and water. Additional ingredients that can be included in the primer composition include latex particles, a wax, and/or a surfactant, in some examples.

The polyvinyl alcohol, starch nanoparticles, and polyurethane dispersion can act as a binder in the primer composition. Generally, the amount of these ingredients can be sufficient to act as a binder to bind the remaining ingredients of the primer composition to the substrate. In some examples, the binder content of the primer composition can be within a range such that there is sufficient binder to bind the other ingredients of the primer to the substrate, but not so much that the ink-receiving properties of the primer are compromised. As an example, too much binder can, in some cases, make the primer layer less porous and negatively impact the solution stability of the primer. This can interfere with the interaction between the primer layer and water-based inks. In some examples, the total amount of binder present in the primer composition can be from 5 wt % to 70 wt %. In other examples, the total amount of binder can be from 5 wt % to 50 wt %, 10 wt % to 30 wt %, or 10 wt % to 20 wt %.

In further detail, the primer composition can include polyvinyl alcohol in an amount from 1 wt % to 40 wt %, 2 wt % to 30 wt %, or 5 wt % to 20 wt %, based on the weight of all dry components of the primer composition.

The type of polyvinyl alcohol is not particularly limited with respect to the molecular weight and degree of hydrolysis of the polyvinyl alcohol. However, in some examples, the polyvinyl alcohol can have a weight-average molecular weight from 1,000 $M_w$ to 300,000 $M_w$. In further examples, the polyvinyl alcohol can have an average molecular weight from about 20,000 $M_w$ to about 250,000 $M_w$. In more specific examples, the polyvinyl alcohol can have an average molecular weight from about 27,000 $M_w$ to about 205,000 $M_w$. The degree of hydrolysis of the polyvinyl alcohol can be from about 75 mol % to about 100 mol %. In certain examples, the degree of hydrolysis can be from about 86 mol % to about 100 mol %. It is believed that the hydroxyl groups on the polyvinyl alcohol can interact with the cationic salt in the primer composition to form a complex-like structure, which improves the instant smearfastness of printed images on a primer coated substrate. Non-limiting examples of polyvinyl alcohols that can be used in the primer composition include Poval® 4-98 (Kuraray America, Inc.) (27,000 $M_w$, 98-98.8 mol % hydrolysis); Poval® 13-88 (Kuraray America, Inc.) (86.7-88.7 mol % hydrolysis); Poval® 18-88 (Kuraray America, Inc.) (130,000 $M_w$, 86.7-88.7 mol % hydrolysis); Poval® 26-88 (Kuraray America, Inc.) (86.7-88.7 mol % hydrolysis); and/or Poval® 40-88 (Kuraray America, Inc.) (205,000 $M_w$).

The polyvinyl alcohol can in some cases be a mixture of two or more types of polyvinyl alcohol. In such examples, the total amount of the polyvinyl alcohols can be from 1 wt % to 40 wt %, 2 wt % to 30 wt %, 5 wt % to 20 wt %, based on the weight of all dry components of the primer composition. Whatever range is considered, it is understood that the range relates to total concentrations of polyvinyl alcohol, whether there be one, two, three, etc., specific polyvinyl alcohol species present. In one example, the primer composition can include a mixture of two types of polyvinyl alcohol having different molecular weights.

In addition to the polyvinyl alcohol, the binder can include starch nanoparticles. Starch is a carbohydrate consisting of linear or branched polysaccharide chains. Starch is often available in granular form, with granules having an average diameter of 10 μm to 100 μm or larger. Starch nanoparticles are different from this common form of starch in that the starch nanoparticles have a smaller, nano-sized average diameter. For example, starch nanoparticles can have an average diameter from 1 nm to 1 μm. The starch nanoparticles used in the binder for the present primer compositions can have an average diameter within this range of 1 nm to 1 μm. In some examples, the starch nanoparticles can have an average diameter from 10 nm to 500 nm, 20 nm to 200 nm, or 50 nm to 150 nm.

Non-limiting examples of suitable starch nanoparticles for use in the present primer compositions include Ecosphere® 2202D, 2260, 2330 and 2326 (EcoSynthetix Inc.). These starch nanoparticles are cross-linked starch with a nanoparticle structure, and can yield better durability than traditional starches that are non-crosslinked polymers. In some examples, the primer composition can include starch nanoparticles in an amount from 1 wt % to 20 wt %, 1 wt % to 10 wt %, or 2 wt % to 5 wt % based on the weight of all dry components of the primer composition.

The binder of the primer composition can also include a polyurethane dispersion. The polyurethane dispersion can be water-based, with little or no volatile organic content (VOC). Polyurethane dispersions can include polyurethane polymer that has already reacted, i.e., the polymer is already formed from monomers such as polyols and isocyanates. As such, the polyurethane dispersion can include little or no free isocyanate.

In some examples, the polyurethane dispersion can be crosslinkable. In some aspects, the crosslinkable polyurethane dispersion can include crosslinkable components, such as crosslinkable groups pendant from the polyurethane polymer. Non-limiting examples of such crosslinkable groups can include carboxyl, hydroxyl, amino, and mercapto groups. In a specific example, the crosslinkable polyurethane can include carboxyl groups pendant from the polymer chains of the polyurethane, as terminal groups on the polymer chains of the polyurethane, or both. In additional aspects, the crosslinkable polyurethane dispersion can be self-crosslinkable, crosslinkable through addition of a crosslinking agent, or both. In some examples, the crosslinkable polyurethane can be crosslinked after the primer composition is coated on a substrate by application of heat, evaporation of solvent, exposure to actinic radiation such as UV light, or by addition of a crosslinking agent. In a specific example, the crosslinkable polyurethane can be crosslinkable without a crosslinking agent, and the primer composition can be substantially devoid of crosslinking agent. By "substantially devoid" or "substantially free of," what is meant is that the component described is either completely absent, or is present in only de minimis or residual amounts that do not have an material impact on the nature of the composition compared to a composition without any of the component present. In another specific example, the primer composition can include a crosslinking agent to enable or increase the rate of crosslinking. In certain examples, the crosslinkable polyurethane dispersion can be configured to crosslink after the primer composition is coated on a substrate, before the substrate is rewound at the rewinding station of a high speed press. The polyurethane can crosslink before ink is printed over the primer layer, while ink is printed over the primer layer, after ink is printed over the primer layer, or combinations thereof. In some cases, the polyurethane can at least partially crosslink before the substrate is rewound at the rewinding station, although additional crosslinking can occur after rewinding. Without being bound to a specific mechanism, it is believed that crosslinking of the polyurethane dispersion after coating the substrate with the primer composition can contribute to the durability of the primer layer and images printed thereon.

Adding the polyurethane dispersion to the polyvinyl alcohol and starch nanoparticles can produce a binder that provides good dry and wet smearfastness. This binder can also provide good gloss to the substrate coated with the primer composition. In some examples, the polyurethane dispersion can be present in the primer composition in an amount from 1 wt % to 20 wt %, 1 wt % to 10 wt %, or 2 wt % to 5 wt % based on the weight of all dry components of the primer composition. In certain examples, the polyurethane dispersion can be present in an equal amount as the starch nanoparticles. Non-limiting examples of suitable polyurethane dispersions for use in the present primer compositions can include Sancure® 20041, 20037F, 20025F, 13094HS, 2715 and 861 (Lubrizol Advanced Materials, Inc.), Acrysol™ RM-2020 (Dow Chemical Company), PrintRite™ DP376 (Lubrizol Advanced Materials, Inc.), and Lucidene™ 645 (Dow Chemical Company).

In some cases, the primer composition can include additional binders. Non-limiting examples of such binders include cellulose, polyethylene oxide, polyvinyl pyrrolidone, and others. The additional binders can also be mixtures of two or more water soluble polymeric binders. In some examples, if additional binders are present then the additional binders can be present in a smaller amount than the combined polyvinyl alcohol, starch nanoparticles, and polyurethane dispersion. In further examples, the combined polyvinyl alcohol, starch nanoparticles, and polyurethane dispersion can make up at least 10 wt % by dry weight of all binders present in the primer composition. In still further examples, the combined polyvinyl alcohol, starch nanoparticles, and polyurethane dispersion can make up at least 80 wt % by dry weight of all binders present in the primer composition. In a specific example, the primer composition can be substantially free of any binder other than the polyvinyl alcohol, starch nanoparticles, and polyurethane dispersion.

The primer composition can also include a cationic salt. The cationic salt can be present in an amount sufficient to immobilize pigment colorants in the ink to be printed over the primer and to yield good image quality. In some examples, the primer composition can include the cationic salt in an amount from 10 wt % to 50 wt %, 10 wt % to 40 wt %, 15 wt % to 30 wt %, or 20 wt % to 30 wt % based on the weight of all dry components of the primer composition.

The cationic salt can include a metal cation. In some examples, the metal cation can be sodium, calcium, copper, nickel, magnesium, zinc, barium, iron, aluminum, chromium, or other metal. The cationic salt can also include an anion. In some examples, the anion can be fluoride, chloride, iodide, bromide, nitrate, chlorate, acetate, or $RCOO^-$ where R is hydrogen or any low molecular weight hydrocarbon chain, e.g., C1 to C12. In a more specific example, the anion can be a carboxylate derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms may include formic acid, acetic acid, propionic acid, butyric acid, isobutyric acid, valeric acid, isovaleric acid, pivalic acid, and/or hexanoic acid. In some cases, the cationic salt can be a polyvalent metal salt made up of a divalent or higher polyvalent metallic ion and an anion. In certain examples, the cationic salt can include calcium chloride, calcium nitrate, magnesium nitrate, magnesium acetate, and/or zinc acetate. In one aspect, the cationic salt can include calcium chloride or calcium nitrate ($CaCl_2$ or $Ca(NO_3)_2$). In one additional specific aspect, the cationic salt can include calcium chloride ($CaCl_2$). The cationic salt can also be a mixture of two or more different cationic salts. In such examples, the total amount of the mixture of cationic salts can be 10 wt % to 50 wt %, 10 wt % to 40 wt %, 15 wt % to 30 wt %, or 20 wt % to 30 wt % based on the weight of all dry components of the primer composition. Whatever range is considered, it is understood that the range relates to total concentrations of salts, whether there be one, two, three, etc., specific salt species present.

The primer composition can also include latex particles. In some examples, the latex particles can be present in an amount from about 10 wt % to about 70 wt % based on the weight of all dry components of the primer composition. In further examples, the latex particles can be present in an amount from 20 wt % to 60 wt % based on the weight of all dry components of the primer composition. Additionally, the primer composition can be predominantly (greater than 50 wt % by dry weight) made up of the latex particles, the polyvinyl alcohol, the starch nanoparticles, the polyurethane dispersion, and the cationic salt. In one example, the polyvinyl alcohol, starch nanoparticles, polyurethane dispersion, cationic salt, and latex particles can make up at least 80 wt % of all dry ingredients in the primer composition.

The latex particles can be used to improve the film strength of the primer layer. In one example, the glass transition temperature (Tg) of the latex can be from 0° C. to 100° C. The latex polymer can be anionic, nonionic, or cationic. In some examples, the latex particles can be cationic latex particles.

In other examples, the latex particles can be made of polymers and copolymers including acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers. In another example, the latex particles can include a vinyl acetate-based polymer, an acrylic polymer, a styrene polymer, a styrene-butadiene (SBR)-based polymer, a polyester-based polymer, a vinyl chloride-based polymer, an acid-based polymer, or the like. In one aspect, the latex particles can be a polymer or a copolymer including acrylic polymers, vinyl-acrylic copolymers and acrylic-polyurethane copolymers. In another aspect, the latex particles can be cationic acrylate latex. In one specific aspect, the latex can be a vinyl acetate polymer. In another specific aspect, the latex can be a SBR polymer.

Generally, the latex particles can have a weight average molecular weight ($M_w$) of 5,000 $M_w$ to 500,000 $M_w$. In one example, the latex particles can range from 150,000 $M_w$ to 300,000 $M_w$. In some examples, the average particle diameter of the latex particles can be from 10 nm to 1 µm and, as other examples, from 10 nm to 500 nm, and in yet other examples, from 50 nm to 250 nm. The particle size distribution of the latex is not particularly limited, and either latex having a broad particle size distribution or latex having a mono-dispersed particle size distribution may be used. It is also possible to use two or more kinds of polymer fine particles each having a mono-dispersed particle size distribution in combination.

Many coating compositions for inkjet printing include inorganic pigments to improve the absorption properties of the coating. Such inorganic pigments can include, for example, clays such as kaolin clay or calcined clay, ground calcium carbonate, precipitated calcium carbonate, barium sulfate, titanium dioxide, silica, aluminum trihydrate, aluminum oxide, boehmite, or combinations thereof. However, in some examples, the present primer composition can be substantially devoid of inorganic pigments. In other examples, the primer composition can include an inorganic pigment. In some examples, the primer composition can include an inorganic pigment in an amount of about 5 wt % or less of all dry components of the primer composition. Thus, the primer composition can include a relatively small amount of inorganic pigment, such as less than 5 wt %. In certain examples, the primer composition can be acidic and can include an inorganic pigment that is compatible with acid, such as a clay.

In further examples, the primer composition can include other additives such as slip aids that contribute to abrasion resistance and coefficient of friction (COF) reduction. For example, a wax can be included as a slip aid. Suitable waxes can include particles of a synthetic wax, natural wax, combinations of a synthetic wax and a natural wax, combinations of two or more different synthetic waxes, or combinations of two or more different natural waxes, for example. In some examples, the synthetic wax can include polyethylene, polypropylene, polybutadiene, polytetrafluoroethylene, polyvinylfluoride, polyvinyldiene fluoride, polychlorotrifluoroethylene, perfluoroalkoxy polymer, perfluoropolyether, polyurethane, polyethylenechlorotrifluoroethylene, polyethylene-vinyl acetate, epoxy resin, silicone resin, polyamide resin, polyamide, or polyester resin. In some examples, the natural wax can include carnauba wax, paraffin wax, montan wax, candelilla wax, ouricury wax, sufarcane wax, retamo wax, or beeswax. In one example, the wax can be a polyethylene wax, such as a high density polyethylene wax. Commercially available slip aids that can be used include Michemshield® 29235 (Michelman, Inc.), Ultralube® E846 (Keim-Additec Surface GmbH), and Ultralube® D-806 (Keim-Additec Surface GmbH), for example. In some examples, a wax can be present in the primer composition at an amount of 1 wt % to 20 wt % of all dry ingredients in the primer composition. In other examples, the wax can be present in an amount of 5 wt % to 15 wt % of all dry ingredients in the primer composition.

The primer composition can also include other coating additives such as surfactants, rheology modifiers, defoamers, optical brighteners, biocides, pH controlling agents, dyes, and other additives for further enhancing the properties of the primer composition. The total amount of such optional coating additives can be present, individually, in the range of 0.01 wt % to 5 wt % of all dry ingredients of the primer composition.

Figure 1:
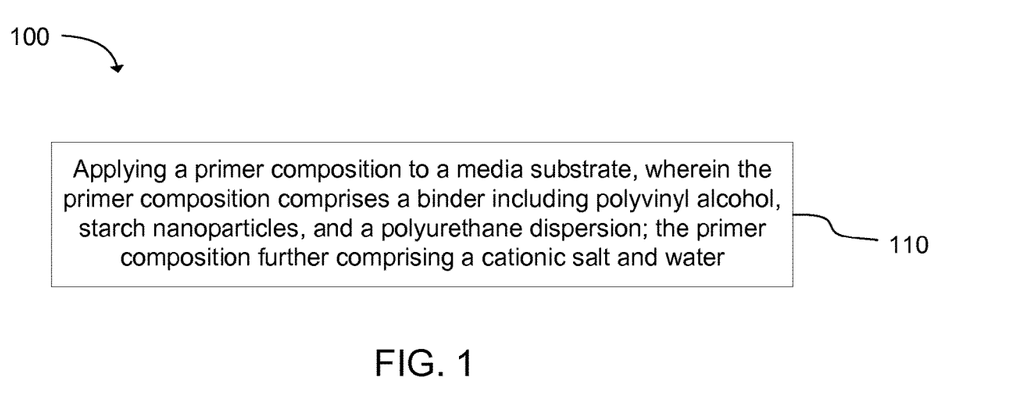
FIG. 1 illustrates a method of coating a media substrate in accordance with an example of the present technology.

The present technology also extends to methods of coating a media substrate. FIG. 1 provides an exemplary method of coating a media substrate 100. The method includes applying 110 a primer composition to a media substrate, wherein the primer composition includes a binder including polyvinyl alcohol, starch nanoparticles, and a polyurethane dispersion. The primer composition further includes a cationic salt, and water.

The primer composition used in the method can have any of the ingredients in the amounts described above with respect to the primer composition. In a particular example, the method can include applying a primer composition that includes the polyvinyl alcohol in an amount from 1 wt % to 40 wt % of all dry ingredients in the primer composition, starch nanoparticles in an amount from 1 wt % to 20 wt %, and a polyurethane dispersion in an amount from 1 wt % to 20 wt % of all dry ingredients in the primer composition. In another example, the method can include applying a primer composition that includes latex particles present in an amount from 20 wt % to 70 wt % of all dry components of the primer compositions. In a further example, the method can include applying a primer composition in which polyvinyl alcohol, starch nanoparticles, polyurethane dispersion, latex particles, and cationic salt make up at least 80 wt % of all dry ingredients in the primer composition. In yet another example, the method can include applying a primer composition that is substantially devoid of inorganic pigments.

The composition can be applied to the substrate by any of a number of coating methods. In accordance with examples of the present disclosure, the substrate can be coated by spray coating, dip coating, cascade coating, roll coating, gravure coating, curtain coating, air knife coating, cast coating, Meyer rod coating, blade coating, film coating, metered size press coating, puddle size press coating, calender stack, and/or by using other known coating techniques. The thickness selected for the coating layer can vary. In one example, the primer composition can be applied at a dry coat weight from 0.1 gsm to 20 gsm. In another example, the primer composition can be applied to the substrate at a dry coat weight from 0.3 gsm to 10 gsm. In another example, the primer composition can be applied to the substrate at a dry coat weight from 0.3 gsm to 5 gsm. In another example, the primer composition can be applied to the substrate at a dry coat weight from 0.3 gsm to 1 gsm.

The method of coating the media substrate can further include allowing a sufficient time for the primer layer to dry before printing ink on the primer layer. The primer layer can be dried with infrared lamp, hot air and combination thereof. The primer layer can retain from about 0.01 wt % to about 10 wt % water, based on the total weight of the coating, when the coating is dry enough to print on. In some examples, the coating can have from about 1 wt % to about 6 wt % water remaining when an image is printed on the coated substrate. Thus, it is understood that the "dry coat weight" described herein refers to dry components, even if some water remains behind in the final formulation coating.

Ink can be printed on the primer layer. Printing can occur when the primer layer is partially dry or fully dry (i.e. dry to the touch but still may include some residual water). In some cases, the ink can be a water-based ink such as a water-based inkjet ink. Inkjet inks generally include a colorant dispersed or dissolved in an ink vehicle. As used herein, "liquid vehicle" or "ink vehicle" refers to the liquid fluid in which a colorant is placed to form an ink. Ink vehicles are well known in the art, and a wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, etc.

Generally the colorant discussed herein can include a pigment and/or dye. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. In most instances, dyes are water soluble. Furthermore, as used herein, "pigment" generally includes pigment colorants, magnetic particles, aluminas, silicas, and/or other ceramics, organo-metallics or other opaque particles. In one example, the colorant can be a pigment.

Typical ink vehicle formulations can include water, and can further include co-solvents present in total at from 0.1 wt % to 40 wt %, depending on the jetting architecture, though amounts outside of this range can also be used. Further, additional non-ionic, cationic, and/or anionic surfactants can be present, ranging from 0.01 wt % to 10 wt %. In addition to the colorant, the balance or much of the remaining of formulation components can be purified water. Other solids can likewise be present in the inkjet ink, such as latex particles.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), ACTI-CIDE® (Thor Specialties Inc.) and combinations thereof.

The present technology also extends to coated media substrates. The media substrate can include a variety of types of base substrate, including paper media, nonporous media, swellable media, microporous media, photobase media, offset media, coated media, uncoated media, and other types of media including plastics, vinyl media, fabrics, woven substrate, etc. In certain examples, the substrate can be a swellable media, a microporous media, or an offset media. The primer composition according to the present technology can be especially useful for coating offset media, which typically has a small pore diameter and hydrophobic surface that does not interact well with water based inks.

In one example, a coated media substrate according to the present technology can include a media substrate and a primer layer coated on a surface of the media substrate. The primer layer can include a binder having polyvinyl alcohol, starch nanoparticles, and a polyurethane dispersion. The primer layer can also include a cationic salt.

Figure 2:
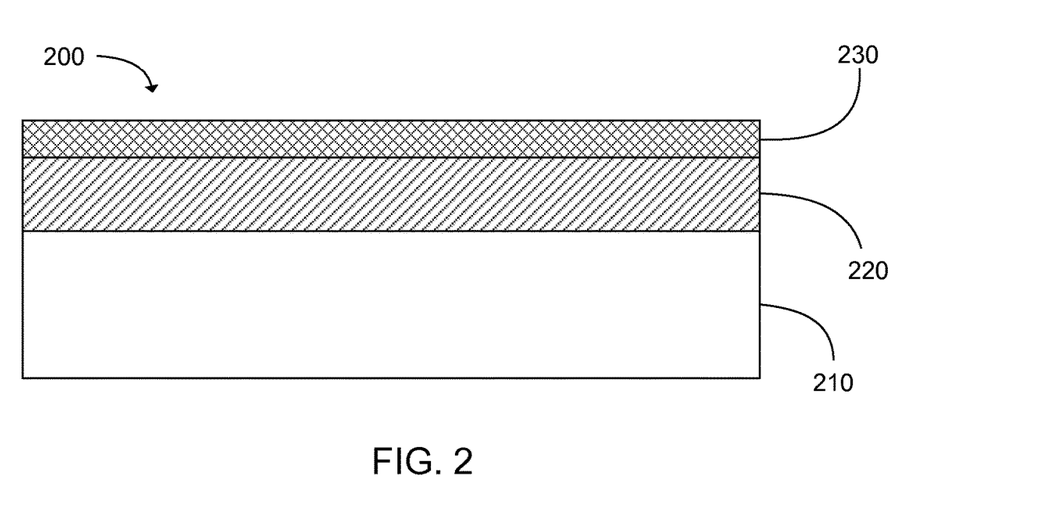
FIG. 2 shows a cross-sectional view of a coated media substrate in accordance with an example of the present technology.

FIG. 2 shows an example of a coated media substrate 200. A base substrate 210 is coated with a primer layer 220. On top of the primer layer, ink jet ink 230 can be printed to form a printed image. The image can have improved instant dry smearfastness after printing.

Figure 3:
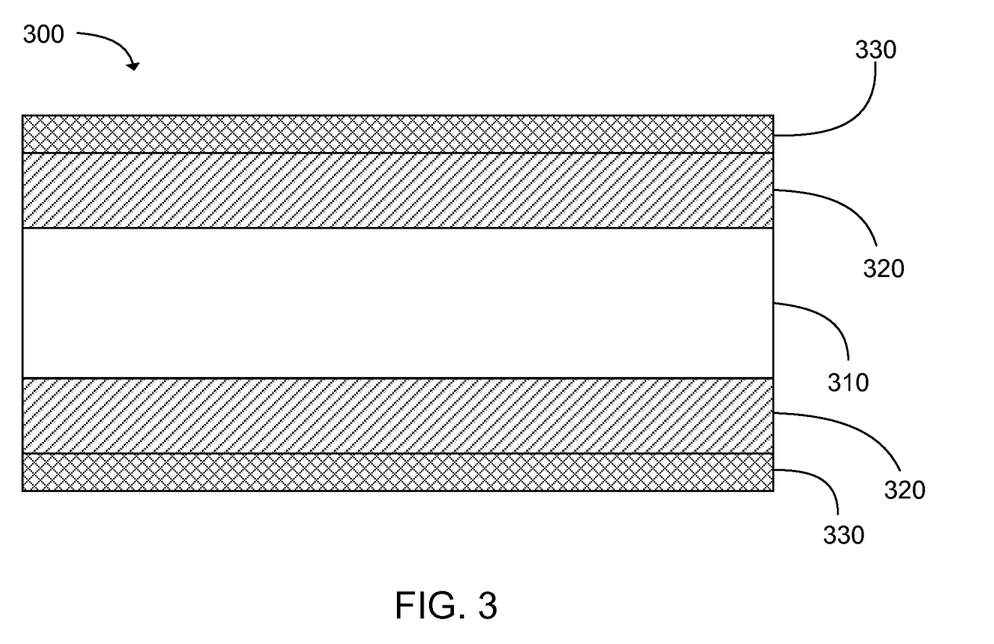
FIG. 3 shows a cross-sectional view of a coated media substrate in accordance with an example of the present technology.

FIG. 3 shows another example of a coated media substrate 300. In this example, the base substrate 310 has a primer layer 320 coated on both sides of the base substrate. Ink jet ink 330 is used to print images one or on both sides of the coated substrate. Thus, the coated media substrate can be used for double sided printing. Although not shown in the figures, the base substrate can also include its own coating, such as the hydrophobic coating on offset paper. Certain coatings (or pre-coatings) described herein can often already be present as part of a substrate, and these coatings are not the same as the primer layer primarily discussed in the context of the present disclosure. Offset media or photobase, for example, already include coatings on one or both side of a substrate material (and thus are considered to be part of the base substrate). The primer compositions of the present disclosure, conversely, are those which are overcoated with respect to the pre-applied coatings, or alternatively, to substrates that are not already pre-coated. Such coatings, i.e. the pre-coating and/or the primer compositions of the present disclosure, can be present on either one side of a media substrate or both.

The primer layer on the coated substrate can be formed by applying the primer compositions disclosed herein using any of the methods disclosed herein. As such, the primer layer can include any of the additional ingredients in any of the amounts disclosed for the primer compositions described herein. In a specific example, the polyurethane dispersion in the primer layer of the coated media substrate can be a crosslinkable polyurethane dispersion. In another specific example, the primer layer can include latex particles in an amount from 10 wt % to 70 wt % of all dry components of the primer layer. Additionally, the polyvinyl alcohol, starch nanoparticles, polyurethane dispersion, latex particles, and cationic salt make up at least 80 wt % of all dry components of the primer layer.

In yet another example of the present technology, a printing system can include an inkjet ink and a coated media substrate as described above. The coated media substrate can include a media substrate and a primer layer coated on a surface of the media substrate. The primer layer can include a polyvinyl alcohol, starch nanoparticles, a polyurethane dispersion, and a cationic salt.

It is noted that, as used in this specification and the appended claims, the singular forms "a," "an," and "the" include plural referents unless the content clearly dictates otherwise.

"Substrate" or "media substrate" includes any base material that can be coated in accordance with examples of the present disclosure, such as film base substrates, polymer substrates, conventional paper substrates, photobase substrates, offset media substrates, and the like. Further, pre-coated and film coated substrates can be considered a "substrate" that can be further coated in accordance with examples of the present disclosure.

"Slip aid" refers to materials that can be added to coating compositions herein to provide abrasion resistance to coatings of the present disclosure.

"Instant dry smearfastness" refers to the ability of a printed image to resist smearing when rubbed with a dry instrument such as a finger or a Rubber Eraser Tool, immediately after printing or within a short time of being printed. The short time can be, for example, from 1 second to 30 seconds, from 1 second to 20 seconds, or from 5 seconds to 10 seconds. In some cases, the short time can be the time required for a printed image to travel from the inkjet printer to a rewinding roll. In one example, a printed image on an HP T200 Web Press® takes from 5 seconds to 10 seconds to reach the rewinder after being printed.

"Instant wet smearfastness" refers to the ability of a printed image to resist smearing when rubbed with a wet instrument such as a wet finger immediately after printing or within a short time of being printed. The short time can be, for example, from 1 second to 30 seconds, from 1 second to 20 seconds, or from 5 seconds to 10 seconds. In some cases, the short time can be the time required for a printed image to travel from the inkjet printer to a rewinding roll. In one example, a printed image on an HP T200 Web Press® takes from 5 seconds to 10 seconds to reach the rewinder after being printed.

"Instant mechability" refers to the instant dry and wet smearfastness and the scratch resistance of a sample after printing, drying, and reaching the rewinding station.

When referring to "high speed" as it related to a digital printing press, presses such as the HP T200 Web Press® or the HP T300 Web Press® exhibit printing speeds that are commensurate of what is considered to be "high speed." For example, the HP T300 Web Press® can print text and/or other images on media at a rate of 400 feet per minute. This capability would be considered high speed. In another example, and more generally, printing at 100 feet per minute would also be considered high speed.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the coated media substrate, the method of coating a substrate, or the primer compositions herein, each of these discussions can be considered applicable to each of these examples, whether or not they are explicitly discussed in the context of that example. Thus, for example, in discussing details about the coated media substrate per se, such discussion also refers to the methods and primer compositions described herein, and vice versa.

The following examples illustrate some of the primer compositions, coated media substrates, systems, and methods that are presently known. However, it is to be understood that the following are only exemplary or illustrative of the application of the principles of the present compositions, systems, and methods. Numerous modifications and alternative compositions, systems, and methods may be devised without departing from the spirit and scope of the present disclosure. The appended claims are intended to cover such modifications and arrangements. Thus, while the examples have been described above with particularity, the following provide further detail in connection with what are presently deemed to be the acceptable examples.

EXAMPLES

Formulation Examples 1-10 were prepared according to Tables 1A and 1B. Examples 2-10 are examples prepared according to the present technology and Example 1 is a comparative example.

TABLE 1A

| Ingredient Dry Wt % | Example No. | | | | |
| --- | --- | --- | --- | --- | --- |
| | 1 | 2 | 3 | 4 | 5 |
| Poval ® 13-88 (polyvinyl alcohol) | 8 | 8 | 8 | 8 | 8 |
| Poval ® 18-88 (polyvinyl alcohol) | 3 | 3 | 3 | 3 | 3 |
| Ecosphere ® 2202D (starch nanoparticles) | 4 | 4 | 4 | 4 | 4 |
| Litex ® 9710 (carboxylated butadiene acrylonitrile copolymer latex) | 52 | 50 | 50 | 50 | 50 |
| Sancure ® 20041 (cross-linking polyurethane dispersion) | | | | | 4 |
| Acrysol ™ RM-2020 (polyurethane dispersion) | | 4 | | | |
| PrintRite ™ DP376 (polyurethane dispersion) | | | 4 | | |
| Lucidene ™ 645 (polyurethane dispersion) | | | | 4 | |
| Ultralube ® D-806 (polyethylene wax) | 10 | 10 | 10 | 10 | 10 |
| Calcium Chloride (cationic salt) | 22 | 20 | 20 | 20 | 20 |
| TEGO Wet 510 (surfactant) | 1 | 1 | 1 | 1 | 1 |

TABLE 1B

| Ingredient Dry Wt % | Example No. | | | | |
| --- | --- | --- | --- | --- | --- |
| | 6 | 7 | 8 | 9 | 10 |
| Poval ® 13-88 (polyvinyl alcohol) | 8 | 8 | 8 | 8 | 8 |
| Poval ® 18-88 (polyvinyl alcohol) | 3 | 3 | 3 | 3 | 3 |
| Ecosphere ® 2202D (starch nanoparticles) | 4 | 4 | 4 | 4 | 4 |
| Litex ® 9710 (carboxylated butadiene acrylonitrile copolymer latex) | 52 | 50 | 50 | 50 | 50 |
| Sancure ® 20037F (cross-linking polyurethane dispersion) | 4 | | | | |
| Sancure ® 20025F (cross-linking polyurethane dispersion) | | 4 | | | |
| Sancure ® 13094HS (cross-linking polyurethane dispersion) | | | 4 | | |
| Sancure ® 2715 | | | | 4 | |

TABLE 1B-continued

| Ingredient Dry Wt % | Example No. | | | | |
|---|---|---|---|---|---|
| | 6 | 7 | 8 | 9 | 10 |
| (cross-linking polyurethane dispersion) | | | | | |
| Sancure ® 861 (cross-linking polyurethane dispersion) | | | | | 4 |
| Ultralube ® D-806 (polyethylene wax) | 10 | 10 | 10 | 10 | 10 |
| Calcium Chloride (cationic salt) | 22 | 20 | 20 | 20 | 20 |
| TEGO Wet 510 (surfactant) | 1 | 1 | 1 | 1 | 1 |

Poval ® (from Kuraray America, Inc.)
Ultralube ® (from Keim-Additec Surface GmbH)
TEGO ® (from Evonik Resource Efficiency GmbH)
Ecosphere ® (from EcoSynthetix Inc.)
Litex ® (from Synthomer LLC)
Sancure ® (from Lubrizol Advanced Materials, Inc.)
Acrysol ™ (from Dow Chemical Company)
PrintRite ™ (from Lubrizol Advanced Materials, Inc.)
Lucidene ™ (from Dow Chemical Company)

The Example formulations 1-10 were coated onto Sterling® Ultra Gloss (Verso Corporation), 60 # paper with 2 g/m² (gsm) of dry coating weight. Samples were printed with an HP CM8060 M FP Edgeline printer, from Hewlett-Packard Co., Palo Alto, Calif., USA (HP), using HP A50 pigment inks (i.e. aqueous inkjet ink for digital inkjet printing). The printing process used involved 2 passes and six dry spin conditions to mimic high-speed, digital, web press inkjet printing. Dry and wet smearfastness refer to the ability of the printed image to resist appearance degradation upon rubbing or smearing the image by dry or wet finger. For the dry and wet finger smearfastness tests, a dry or wet finger was placed against a printed area, pushed with force of about 50 g/in², and drawn toward the tester. The finger was then released to check the tested area.

The results of the dry finger smearfastness test, wet finger smearfastness test, and sheet gloss are shown in Tables 2A and 2B. For the dry and wet finger smearfastness tests, the visual ranking is based on a 1 to 5 scale, with 1 being the worst and 5 being the best. A ranking equal to or greater than 3 is considered good and acceptable. A ranking below 3 is considered poor and not acceptable. A BYK Gardner Gloss meter is used to measure sheet gloss at 75 degrees. The unit of gloss is %.

TABLE 2A

| Visual Ranking of Performance | | | | | |
|---|---|---|---|---|---|
| | Example No. | | | | |
| | 1 | 2 | 3 | 4 | 5 |
| Instant dry finger smearfastness | 3 | 3 | 3.5 | 3 | 3.5 |
| Instant wet finger smearfastness | 2.75 | 3 | 3 | 3 | 3 |
| Wet finger smearfastness after 7 days | 2.75 | 3 | 3 | 3 | 3.75 |
| Sheet gloss at 75 degrees | 60 | 51 | 4.5 | 54 | 58 |

TABLE 2B

| Visual Ranking of Performance | | | | | |
|---|---|---|---|---|---|
| | Example No. | | | | |
| | 6 | 7 | 8 | 9 | 10 |
| Instant dry finger smearfastness | 3.5 | 3.2 | 3.5 | 3.2 | 3.2 |
| Instant wet finger smearfastness | 3 | 3 | 3 | 3 | 3 |
| Wet finger smearfastness after 7 days | 3.75 | 3.5 | 3.75 | 3.5 | 3.5 |
| Sheet gloss at 75 degrees | 62 | 68 | 61 | 79 | 78 |

Examples 2-10, which included polyvinyl alcohol, starch nanoparticles, and polyurethane dispersions, provided acceptable durability, with Examples 5, 6, and 8 providing the best overall performance. Comparative Example 1, which did not include a polyurethane dispersion, but included polyvinyl alcohol and starch nanoparticles as well as latex particles, provided poor wet finger smearfastness. Examples 2 to 4 showed low gloss numbers indicating that these polyurethane polymers are not compatible with the metal salt, resulting in lower gloss. The other types of polyurethane polymers such as Sancure 20041, 20037F, 20025F, 13094hs, 2715 and 861 showed higher gloss, indicating that they are compatible with metal salt.

While the disclosure has been described with reference to certain examples, various modifications, changes, omissions, and substitutions can be made without departing from the spirit of the disclosure. It is intended, therefore, that the disclosure be limited only by the scope of the following claims.

What is claimed is:

1. A method of coating a media substrate, comprising applying a primer composition to a media substrate to form an ink-receiving primer layer thereon, wherein the ink-receiving primer layer comprises:
   from 5 wt % to 70 wt % binder based on all dry components of the ink-receiving primer layer, the binder including polyvinyl alcohol, starch nanoparticles, and a self-crosslinkable polyurethane dispersion;
   a cationic salt; and
   from 0.01 wt % to 10 wt % water based on a total weight of the ink-receiving primer layer,
   wherein the ink-receiving primer layer is devoid of inorganic pigment, or wherein the ink-receiving primer layer includes inorganic pigment in an amount of about 5 wt % or less based on all dry components of the primer layer.

2. The method of claim 1, wherein the ink-receiving primer layer further comprises latex particles in an amount from 10 wt % to 70 wt % based on all dry components of the primer layer, and wherein the polyvinyl alcohol, the starch nanoparticles, the self-crosslinkable polyurethane dispersion, the latex particles, and the cationic salt make up at least 80 wt % based on all dry components of the ink-receiving primer layer.

3. The method of claim 1, wherein the ink-receiving primer layer further comprises latex particles in an amount from 10 wt % to 70 wt % based on all dry components of the ink-receiving primer layer, and wherein the polyvinyl alcohol, the starch nanoparticles, the self-crosslinkable polyurethane dispersion, the latex particles, and the cationic salt make up at least 80 wt % based on all dry components of the ink-receiving primer layer.

4. The method of claim 3, wherein hydroxyl groups on the polyvinyl alcohol have interacted with the cationic salt to form a complex.

5. The method of claim 1, wherein the self-crosslinkable polyurethane dispersion is present in the ink-receiving primer layer an amount from 1 wt % to 20 wt % based on all dry components of the ink-receiving primer layer, and wherein the cationic salt is present in the ink-receiving primer layer in an amount from 10 wt % to 50 wt % based on all dry components of the ink-receiving primer layer.

6. The method of claim 1, wherein the starch nanoparticles are cross-linked.

7. The method of claim 1, wherein the ink-receiving primer layer is substantially devoid of crosslinking agent.

8. The method of claim 1, wherein the polyvinyl alcohol is a mixture of two different polyvinyl alcohols with different weight-average molecular weights.

9. The method of claim 1, wherein the polyvinyl alcohol has a degree of hydrolysis ranging from 75 mol % to 100 mol %.

10. A coated media substrate, comprising:
a media substrate; and
an ink-receiving primer layer coated on a surface of the media substrate, the ink-receiving primer layer, comprising:
from 5 wt % to 70 wt % binder based on all dry components of the ink-receiving primer layer, the binder including polyvinyl alcohol, starch nanoparticles, and a self-crosslinkable polyurethane dispersion;
a cationic salt; and
from 0.01 wt % to 10 wt %/water based on a total weight of the ink-receiving primer layer,
wherein the ink-receiving primer layer is devoid of inorganic pigment, or wherein the ink-receiving primer layer includes inorganic pigment in an amount of about 5 wt % or less based on all dry components of the primer layer.

11. The coated media substrate of claim 10, wherein the ink-receiving primer layer further comprises latex particles in an amount from 10 wt % to 70 wt % based on all dry components of the ink-receiving primer layer, and wherein the polyvinyl alcohol, the starch nanoparticles, the self-crosslinkable polyurethane dispersion, the latex particles, and the cationic salt make up at least 80 wt % based on all dry components of the ink-receiving primer layer.

12. The coated media substrate of claim 10, wherein the polyvinyl alcohol has a degree of hydrolysis ranging from 75 mol % to 100 mol %.

13. The coated media substrate of claim 12, wherein hydroxyl groups on the polyvinyl alcohol have interacted with the cationic salt to form a complex.

14. The coated media substrate of claim 10, wherein the self-crosslinkable polyurethane dispersion is present in the primer layer an amount from 1 wt % to 20 wt % based on all dry components of the primer layer.

15. The coated media substrate of claim 10, wherein the starch nanoparticles are cross-linked.

16. The coated media substrate of claim 10, wherein the ink-receiving primer layer is substantially devoid of crosslinking agent.

17. The coated media substrate of claim 10, wherein the cationic salt is present in the ink-receiving primer layer in an amount from 10 wt % to 50 wt % of dry components of the ink-receiving primer layer.

18. The coated media substrate of claim 10, wherein the polyvinyl alcohol is a mixture of two different polyvinyl alcohols with different weight-average molecular weights.

19. The coated media substrate of claim 10, wherein the ink-receiving primer layer is devoid of inorganic pigments.

20. The coated media substrate of claim 10, wherein the ink-receiving primer layer further comprises the inorganic pigment, and the inorganic pigment is present in an amount of about 5 wt % or less based on all dry components of the primer layer.

* * * * *